Figure 1:
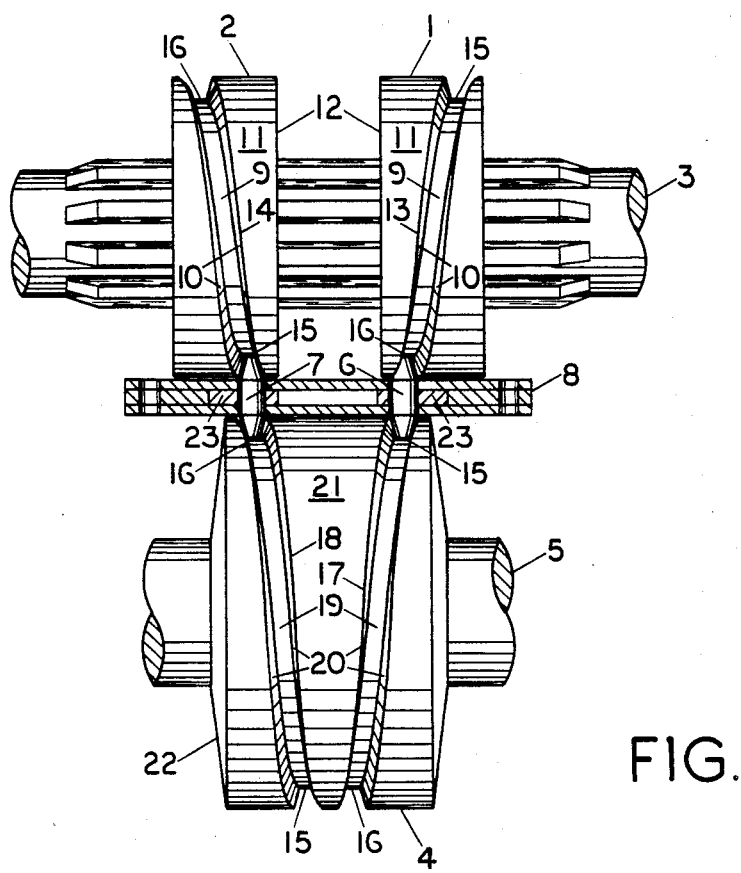

United States Patent [19]

Clegg

[11] Patent Number: 4,651,579
[45] Date of Patent: Mar. 24, 1987

[54] CYLINDRICAL CAM CLUTCH

[76] Inventor: John E. Clegg, 2320 Keystone Dr., Orlando, Fla. 32806

[21] Appl. No.: 859,512

[22] Filed: May 5, 1986

[51] Int. Cl.⁴ ............................................. F16H 21/12
[52] U.S. Cl. ............................................. 74/63; 74/58
[58] Field of Search ............... 74/63, 64, 57, 58, 567, 74/568 R, 569; 192/93 C, 96

[56] References Cited

U.S. PATENT DOCUMENTS

| Re. 30,188 | 1/1980 | Predhome, Jr. | 74/57 X |
| 1,867,504 | 7/1932 | Franklin | 74/567 X |
| 2,349,314 | 5/1944 | Truesdell | 74/567 X |
| 2,440,674 | 5/1948 | Bell | 74/58 |
| 2,471,654 | 5/1949 | Reitz | 74/567 |
| 2,472,919 | 6/1949 | Paris | 74/58 |
| 2,604,788 | 7/1952 | Hauber | 74/58 |
| 3,148,551 | 9/1964 | Phillips | 74/64 |
| 3,465,602 | 9/1969 | Garaud | 74/58 |
| 3,682,005 | 8/1972 | Fantz | 74/58 |

Primary Examiner—Peter A. Aschenbrenner

[57] ABSTRACT

Two reciprocating cylindrical drive cams, each with a continuous spiral groove, mounted on a splined shaft, a driven cylindrical cam with two continuous spiral grooves mounted on a parallel shaft, and two reciprocating pins mounted in an intermediate housing between the drive cams and driven cam. The upper ends of the pins engage the grooves of the drive cams, and the lower ends of the pins engage the grooves of the driven cam. When the drive cams are locked together on the splined shaft, the drive cams revolve and the grooves impart reciprocating motion to the pins which impart revolving motion to the driven cam. When the drive cams are allowed to reciprocate on the splined shaft, the drive cams do not revolve and no motion is transmitted to the pins or to the driven cams.

1 Claim, 3 Drawing Figures

CYLINDRICAL CAM CLUTCH

PRIOR ART

Prior art includes the following inventions;

*Engine Drive,* U.S. Pat. No. 2,440,674, May 1948, by J. D. Bell. This invention features three parallel cylindrical cams driven by the piston of an internal combustion engine. The reciprocating connecting rod imparts revolving motion to the cylinders by engaging two endless helical grooves in the cylinders.

*Apparatus For Transforming A Rotary Motion Into An Alternating Linear Movement,* U.S. Pat. No. 3,465,602, Sept. 1969, by J. P. Garaud. This invention features two parallel cylindrical cams which are driven by gears. The cylinders have continuous spiral grooves which impart alternating linear movement to a sliding element.

There are two other inventions featuring parallel cylindrical cams with helical grooves which operate sliding elements, these being; *Mechanical Movement,* U.S. Pat. No. 2,472,919, June 1949, by R. E. Paris, and *Double Cam Drive,* U.S. Pat. No. 3,682,005, August 1972, by Paul A. Fantz.

Concurrent art includes *Cylindrical Cams* which is disclosed in a copending application by this inventor. The drive cam of this invention is mounted on a smooth shaft and is similar to the driven cam of the cylindrical cam clutch.

SUMMARY

The invention is distinct and distinguishable over prior art in two respects; first, it uses drive cams to operate a driven cam, and second, the drive cams can be allowed to reciprocate on the shaft so as not to transmit motion to the pins.

The invention is distinct from the *Cylindrical Cams* of the copending application in its use of drive cams which reciprocate.

DRAWINGS

Figure 3:
Figure 2:
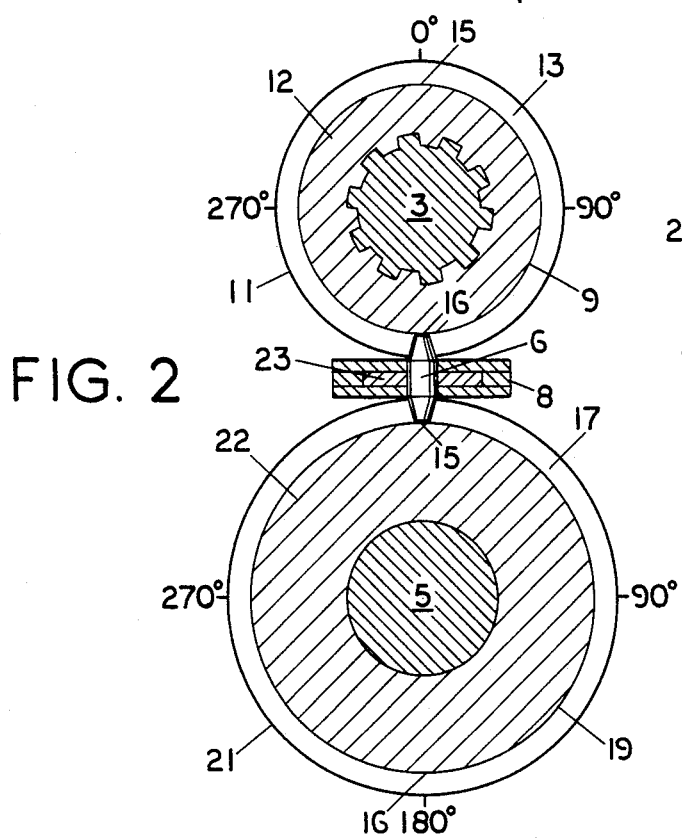

FIG. 1 is an elevation of the cylindrical cam clutch.
FIG. 2 is a cross section of the cylindrical cam clutch.
FIG. 3 is an enlarged view of a reciprocating pin.

DESCRIPTION

FIG. 2 shows the cylindrical cam clutch in the standard position of reference with the tops of the cylinders at 0°, the fronts of the cylinders at 90°, the bottoms of the cylinders at 180°, and the rears of the cylinders at 270°.

FIG. 1 is an elevation of the cylindrical cam clutch showing right drive cam 1 and left drive cam 2 mounted on splined drive shaft 3, showing driven cam 4 mounted on driven shaft 5 which is parallel to drive shaft 3, and showing right reciprocating pin 6 and left reciprocating pin 7 mounted in intermediate housing 8 between drive cams 1 and 2 and driven cam 4.

Each right drive cam 1 and left drive cam 2 has a continuous spiral groove defined by a cylindrical base 9 and two opposed inclined side walls 10 in the face 11 of cylinder 12. Right drive cam 1 and left drive cam 2 are identical but are revolved 180° from each other when installed on splined shaft 3.

The continuous spiral groove of right drive cam 1 is designated right groove 13, and the continuous spiral groove of left drive cam 2 is designated left groove 14.

Each groove 13 and 14 is evenly disposed on opposite sides of central vertical reference planes of revolution which are perpendicular to cylinders 12. The grooves curve outward to right and left from the reference plane, reach a point of maximum distance from the reference plane, and then reverse their direction of curvature and curve back toward the reference plane. The points of maximum distance of the grooves from the reference plane are designated right dead center 15 and left dead center 16. Dead centers 15 and 16 mark the point in the grooves at which the direction of reciprocation of the pins is reversed.

Right groove 13 has its right dead center 15 at 0° and its left dead center 16 at 180°.

Left groove 14 has its right dead center 15 at 182° and its left dead center 16 at 2°. (The 2° difference will be explained below.)

Driven cam 4 has two continuous spiral grooves designated right groove 17 and left groove 18, each groove defined by a cylindrical base 19 and two opposed inclined side walls 20 in face 21 of cylinder 22.

Grooves 17 and 18 also have central vertical reference planes of revolution. Right groove 17 has its right dead center 15 at 0° and its left dead center 16 at 180°. Left groove 18 has its right dead center 15 at 182° and its left dead center 16 at 2°.

The reason for revolving the left groove 14 of left drive cam 2 and the left groove 18 of driven cam 4 2° beyond the right grooves is to avoid having both reciprocating pins positioned at dead center when the machine is shut down and the cylinders stop revolving. During operation the momentum of the cylinders carries the pins past dead center, but when the machine is stopped, started, and the pins begin their movement from a stationary position, those pins which are positioned at dead center could move into the wrong arms of the grooves and reverse the direction of revolution of the cylinders. One pin must be either approaching or passing beyond dead center to prevent reverse revolution when the cylinders start to revolve.

Driven cam 4 can be made to revolve in the same direction as drive cams 1 and 2 by placing the right dead centers 15 at 178° and the left dead centers 16 at 358° in the left grooves 14 and 18.

Reciprocating pins 6 and 7 are mounted in sliding rectangular metal blocks 23 which are adapted to slide laterally in housing 8. The upper end of right pin 6 engages right groove 13 of drive cam 1, and the lower end engages right groove 17 of driven cam 4. The upper end of left pin 7 engages left groove 14 of left cam 2, and the lower end engages the left groove 18 of driven cam 4.

The reciprocating pins roll against the side walls of the grooves. In certain instances the direction of roll at opposite ends of the pins is in opposite directions. The pins are divided into two separate parts in order to accommodate rolls in opposite directions, as shown in FIG. 3. The upper end of the pin consists of a tapered roller 24 integrally adjoined to a shaft 25. The lower end of the pin consists of a tapered roller 26 integrally adjoined to a hollow cylinder 27 in which shaft 25 of the upper end revolves. Cylinder 27 revolves inside sliding block 23.

Operation

FIG. 1 shows the clutch in the disengaged position. Drive cams 1 and 2 are reciprocating and revolving in a clockwise direction on drive shaft 3. Pins 6 and 7 are stationary, and driven cam 4 is stationary.

The clutch is engaged by locking drive cams 1 and 2 together when they revolve 180° from the position shown in FIGS. 1 and 2. In the engaged position the right dead center 15 of drive cam 1 has revolved 180° to the bottom of the shaft and has engaged the upper end of right pin 6. The left dead center 16 of drive cam 2 has revolved 180° to the bottom of the shaft and has engaged the upper end of left pin 7.

During the first revolution of 180° in the engaged position, the right side wall 10 of drive cam 1 will exert pressure (lateral thrust) against right pin 6 and force the pin to the left (toward the center of the housing 8), and the left side wall 10 of drive cam 2 will exert pressure against left pin 7 and force the pin to the right (toward the center of the housing 8).

The lower end of right pin 6 will exert pressure (lateral thrust) against the left side wall 20 of right groove 17 and the lower end of left pin 7 will exert pressure against the right side wall 20 of left groove 18, and driven cam 4 will revolve 180° counterclockwise.

Drive cams 1 and 2 will be locked together by pins located inside drive shaft 3 as disclosed in a copending application.

The cylindrical cam clutch can be modified to operate as a forward-reverse transmission. The outer portion of the left drive cam 2 can be separated from the inner portion and adapted to be revolved 2° on both sides of 0°. The outer portion of the left side of driven cam 4 would be modified in a similar manner. When the outer portions of the cams were revolved to the 2° position, forward drive would result. When the outer portions were revolved to the 358° position, reverse drive would result.

I claim:

1. A cylindrical cam clutch comprising in general two cylindrical drive cams, each with a continuous spiral groove, mounted on a splined shaft, a cylindrical driven cam with two continuous spiral grooves mounted on a parallel shaft, and two reciprocating pins mounted in a housing between the drive cams and driven cam so as to engage the continuous spiral grooves; the aforesaid clutch having a disengaged position in which the drive cams reciprocate on the splined shaft without imparting motion to the pins, and having an engaged position in which the drive cams are locked together so as to impart reciprocating linear motion to the pins which in turn impart revolving motion to the driven cam; and comprising in particular;

two drive cams (1,2) mounted on a splined shaft (3), a driven cam (4) mounted on a parallel shaft (5), and a right reciprocating pin (6) and a left reciprocating pin (7) mounted inside a housing (8) between said drive cams and said driven cam, said drive cams and said driven cam having standard positions of reference in which the tops of the cams are located at 0°, the fronts of the cams are located at 90°, the bottoms of the cams are located at 180°, and the rears of the cams are located at 270°, with said drive cams separated the maximum distance on said splined shaft in said standard position, said drive cams designated right drive cam (1) and left drive cam (2), said right drive cam comprising a cylinder (12) having a face (11), a continuous spiral groove designated right groove (13) located in said face (11) of said cylinder (12), said right groove (13) having a cylindrical base (9) and two opposed inclined side walls (10), said left drive cam comprising a cylinder (12) having a face (11), a continuous spiral groove designated left groove (14) located in said face (11) of said cylinder (12), said left groove (14) having a cylindrical base (9) and two opposed inclined side walls (10), each said right and left grooves (13,14) disposed on opposite sides of central vertical reference planes of revolution perpendicular to said cylinders (12), said right groove (13) having a point designated right dead center (15) located at 0° at maximum distance of said groove to the right of said reference plane, said right groove (13) having a point designated left dead center (16) located at 180° at maximum distance of said groove to the left of said reference plane, said left groove (14) having a point designated right dead center (15) located at 178° or 182° at maximum distance of said groove to the right of said reference plane, said left groove (14) having a point designated left dead center (16) located at 358° or 2° at maximum distance of said groove to the left of said reference plane, said driven cam comprising a cylinder (22) having a face (21), two continuous spiral grooves designated right groove (17) and left groove (18) located in said face (21) of said cylinder (22), each said groove (17,18) having a cylindrical base (19) and two opposed inclined side walls (20), each said right and left grooves (17,18) disposed on opposite sides of central vertical reference planes of revolution perpendicular to said cylinder (22), said right groove (17) having a point designated right dead center (15) located at 0° at maximum distance of said groove to the right of said reference plane, said right groove (17) having a point designated left dead center (16) located at 180° at maximum distance of said groove to the left of said reference plane, said left groove (18) having a point designated right dead center (15) located at 178° or 182° at maximum distance of said groove to the right of said reference plane, said left groove (18) having a point designated left dead center (16) located at 358° or 2° at maximum distance of said groove to the left of said reference plane, said reciprocating pins (6,7) mounted in rectangular sliding blocks (23) enclosed in said housing (8) and adapted to slide laterally therein, each said pin having an upper end comprising a tapered roller (24) integrally adjoined to a shaft (25), and having a lower end comprising a tapered roller (26) integrally adjoined to a hollow cylinder (27), each said shaft mounted in each said hollow cylinder so as to revolve therein, each said hollow cylinder mounted in each said sliding block so as to revolve therein, said upper end of said right pin engaging said right groove (13) of said right drive cam so as to travel therein, said lower end of said right pin engaging said right groove (17) of said driven cam so as to travel therein, said upper end of said left pin engaging said left groove (14) of said left drive cam so as to travel therein, and, said lower end of said left pin engaging said left groove (18) of said driven cam so as to travel therein.

* * * * *